Figure 1:
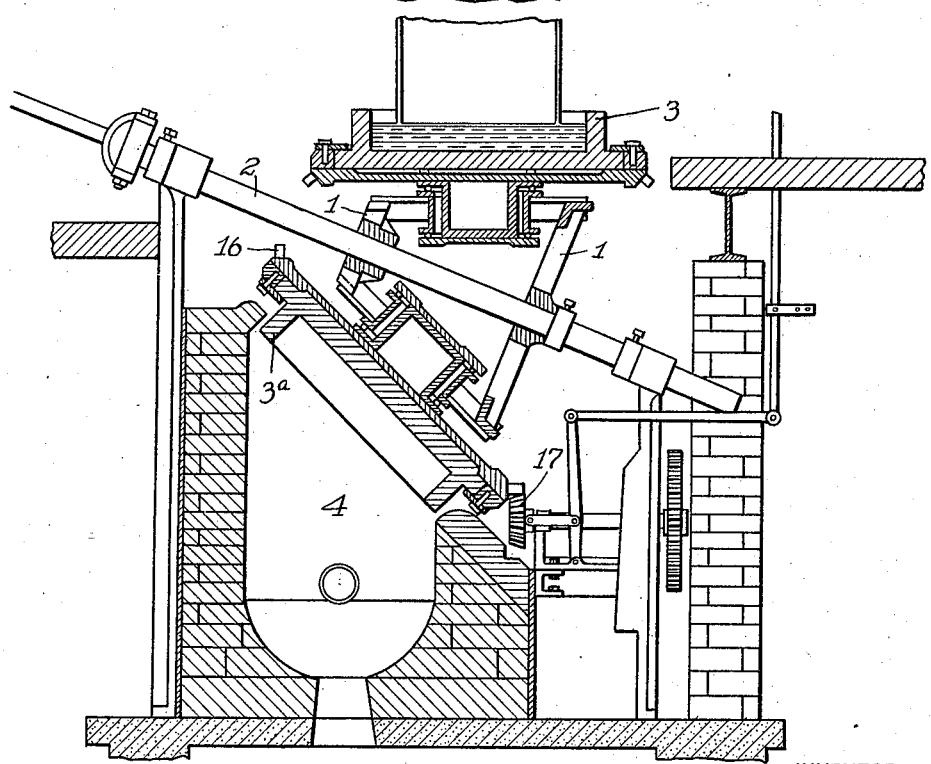

Nov. 19, 1929.  C. H. HARDING  1,736,005
MANUFACTURE OF GLASS CYLINDERS
Filed June 21, 1927   2 Sheets-Sheet 1

INVENTOR
Charles H. Harding,
By Christy & Christy,
Attys.

Nov. 19, 1929.  C. H. HARDING  1,736,005
MANUFACTURE OF GLASS CYLINDERS
Filed June 21, 1927   2 Sheets-Sheet 2
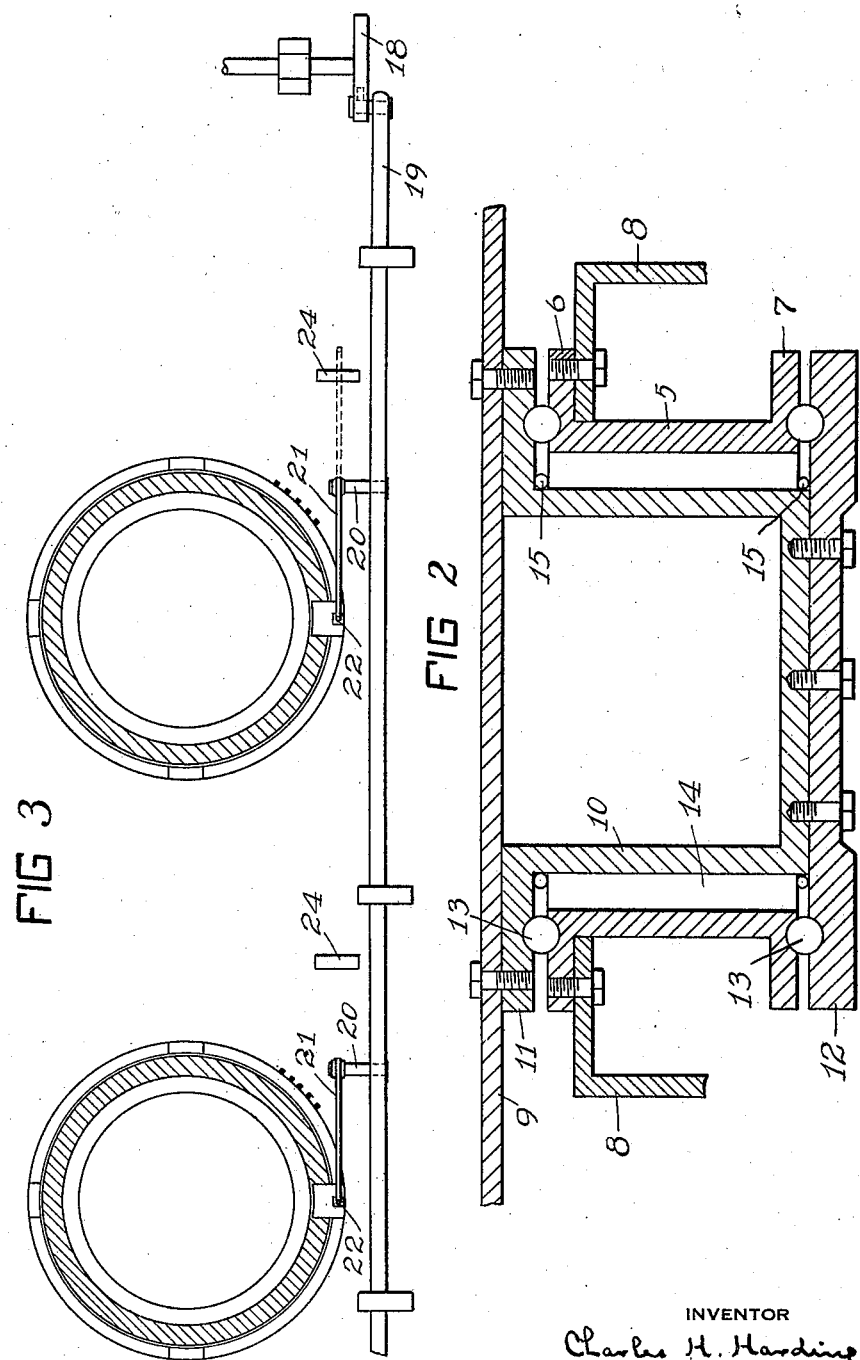
INVENTOR
Charles H. Harding,
by Christy & Christy,
Attys.

Patented Nov. 19, 1929

1,736,005

UNITED STATES PATENT OFFICE

CHARLES H. HARDING, OF FORT SMITH, ARKANSAS

MANUFACTURE OF GLASS CYLINDERS

Application filed June 21, 1927. Serial No. 200,375.

It is the object of the invention to improve the manufacture of drawn glass cylinders, and the invention consists in a new method of manufacture whereby conditions tending toward uniformity of product are neutralized or overcome, the result including not only a uniform product, but a minimum of breakage both in the drawing of the cylinders, and in the subsequent operations of flattening and cutting the glass as well.

In the accompanying drawings I show one form of apparatus which is the best now known to me for the practice of the invention, but the invention itself resides in the new method of manufacture about to be described and which may be practiced by the use of apparatus of various types. Figure 1 is a view in sectional elevation of a suitable organization including a pair of drawing pots and a melting-out furnace, a portion of the drawing mechanism being shown conventionally only. Figure 2 is a vertical section of a portion of the apparatus on a larger scale. Figure 3 is a plan sketch showing one of the pots of each of two machines arranged side by side in the factory.

The pots are mounted upon spiders 1 secured to a shaft 2 in such position that they stand to one another at an angle less than a right angle, so that when one pot, as the pot 3, is in the upper horizontal position, the other pot, as the pot 3ª, is in the lower inverted inclined draining position in the mouth of the inclined upper wall of the kiln or melting-out furnace 4. The pot support consists of an open cylindrical socket 5 having an upper flange 6 and a lower flange 7, the flange 6 being rigidly connected by diametrically opposite angle irons 8 to the spiders 1. The pot-supporting plate 9 carries a depending cylindrical member 10 fitting within said cylindrical socket 5, having an upper flange 11 above the flange 6, and a bottom plate 12 below the flange 7. The flanges 6 and 11 and the flange 7 and the plate 12 are provided with ball races within which are arranged the balls 13, and between the cylindrical socket 5 and the depending member 10 are arranged the vertical rollers 14, held in place above and below by the annular steel strips 15. The plate 9 is provided with the annular teeth 16 arranged at such an angle that when the pot is in the inverted position shown in Figure 1, said teeth will mesh with the pinion 17, which is turned by any suitable means to turn the inverted pot on its axis during the reheating and draining operation. The axial turning of the pot during the remelting of the glass residue is not new with me but is shown and described in United States Letters Patent No. 1,620,308. Although it is an operation which I prefer to employ in the practice of the present invention to the best advantage, it is not an essential feature of the invention in its broader aspect.

It is well recognized that many of the irregularities in drawn glass cylinders, particularly irregularities in thickness on lines circumferential of the cylinder, making what is commonly called thick-and-thin glass, are due to local irregularities in surface tension of the glass in the molten bath from which the cylinder is drawn. Various means and methods have been suggested for counteracting or overcoming the effect of such irregularities, and some of these have been used extensively with varying success. It has also been demonstrated that intelligent practice of the operation of axially turning the pot during remelting of the aftermath, as above described, very largely does away with irregularities in surface tension. But the latter operation is neither a preventive nor a complete antidote for all causes of irregularity or other structural blemishes in the product.

I have discovered that the operation of drawing a glass cylinder from a pot of molten glass is further greatly improved by giving to the pot a reciprocatory turning movement or oscillation on its axis during the drawing operation, without any turning of the bait, correspondingly or otherwise, but lifting the bait upwardly without any turning, in the usual way. For the preferred practice of my improved method n apparatus such as is shown conventionally in Figure 3 may be employed. Referring to Figure 3, the crank-disk 18 is turned by any suitable motor, not shown, and has pivotally connected to it the bar 19 which will be reciprocated longitudinally by the rotation of the disk 18. The bar 19 has the laterally projecting pins 20, and on each of the pins 20 is hinged a rod 21 having a hooked end adapted to be engaged in a hole 22 in the periphery of the pot-support 9, the horizontally positioned pots 3 of two machines like that of Figure 1 being shown on Figure 3.

In drawing a cylinder on one of the machines the charge of molten glass is ladled out of the tank and deposited in the pot 3, and the neck and cap of the cylinder are formed in the usual way during the initial upward movement of the bait 23. When the cap has been developed to the size of the desired cylinder, by which time the glass at and adjacent to the bait will have become set, the hooked rod 21 is thrown into engagement with the hole 22, and during the upward travel of the body of the cylinder the pot 3 is turned back and forth gently on its axis, without any turning movement of the bait 23. Meanwhile the previously used pot 3ª is being reheated and drained, while being independently turned on its own axis, as already explained and as shown in Figure 1. When the rising cylinder has been drawn to its full length the hooked rod 21 is disconnected and thrown back on its rest 24, and the cylinder is cut off and taken down in the usual way. The pots are then reversed in position and the drawing operation is repeated with the pot 3ª.

The timing and amplitude of the axial oscillation of the pot may be varied by operators of ordinary skill in machine drawing to suit conditions. The movement should not be rapid and the reversals of movement should not be abrupt. In drawing a cylinder of a diameter of about thirty inches from a pot of an internal diameter of forty-two inches, I have achieved good results by oscillations of the pot on chords varying from four inches to over twelve inches. With a pot and cylinder of the sizes given an oscillation of about eight to ten inches has been found to be sufficient.

It is not necessary in all cases that the pot shall be oscillated continuously throughout the drawing of the cylinder, but on the other hand the rod 21 may be thrown into or out of connection with the pot at any time during the draw as and when it may be considered by the operator to be necessary or desirable. Nor is the invention limited to reciprocatory axial turning of the pot, for in many cases it will be found that irregularity in the bath or other conditions can be corrected by the workman simply turning the pot in one direction by means of a hook, or by shifting it axially from time to time as may be desired.

I claim as my invention:

1. The method of manufacture of glass cylinders which comprises drawing the cylinder upwardly from a body of molten glass in a pot, and turning the pot on its axis while restraining the body of the cylinder from turning.

2. The method of manufacture of glass cylinders which comprises drawing the cylinder upwardly by means of a bait from a body of molten glass in a pot, and turning the pot on its axis while restraining the bait from turning.

3. The method of manufacture of glass cylinders which comprises drawing the cylinder upwardly from a body of molten glass in a pot and turning the pot in opposite directions on its axis while drawing.

In testimony whereof I have hereunto set my hand.

CHARLES H. HARDING.